United States Patent
Chen et al.

(10) Patent No.: US 8,966,715 B1
(45) Date of Patent: Mar. 3, 2015

(54) SYNCHRONOUS ROTATION MECHANISM FOR DUAL-SHAFT HINGE

(71) Applicant: Lianhong Art Co., Ltd., Taoyuan (TW)

(72) Inventors: Chia-Hui Chen, Taoyuan (TW); Tzu-Yu Lin, Taoyuan (TW); Hsiang-Ho Lo, Taoyuan (TW)

(73) Assignee: Lianhong Art Co., Ltd., Taoyuan (TW)

( * ) Notice: Subject to any disclaimer, the term of this patent is extended or adjusted under 35 U.S.C. 154(b) by 0 days.

(21) Appl. No.: 14/520,241

(22) Filed: Oct. 21, 2014

(30) Foreign Application Priority Data

Nov. 25, 2013 (TW) .............................. 102222006 U (51) Int. Cl.
*E05D 7/00* (2006.01)
*F16H 19/08* (2006.01)

(52) U.S. Cl.
CPC . *F16H 19/08* (2013.01); *E05D 7/00* (2013.01)
USPC ............................................ 16/366; 16/303

(58) Field of Classification Search
CPC ............... E05D 3/12; E05D 3/06; E05D 3/10; G06F 1/1681; G06F 1/1616; G06F 1/1618; E05Y 2900/606; H04M 1/0216; H04M 1/0222; H04M 1/022; H05K 5/0226
USPC ........... 16/366, 368, 369, 340, 337, 334, 389, 16/357, 360, 361, 342, 330, 303; 361/679.6, 679.9, 679.17, 679.27; 248/917–923, 284.1; 379/433.12, 379/433.13; 455/575.1, 575.3, 575.4, 455/550.1, 90.3; 348/333.06, 373, 794
See application file for complete search history.

(56) References Cited

U.S. PATENT DOCUMENTS

| 7,117,563 | B2 * | 10/2006 | Chen et al. ....................... 16/330 |
| 7,512,426 | B2 * | 3/2009 | Maatta et al. ............... 455/575.1 |
| 2002/0038493 | A1 * | 4/2002 | Ko et al. .......................... 16/303 |
| 2005/0050686 | A1 * | 3/2005 | Kurokawa ........................ 16/354 |
| 2010/0071159 | A1 * | 3/2010 | Myung ............................ 16/303 |
| 2011/0157780 | A1 * | 6/2011 | Wang et al. .............. 361/679.01 |
| 2013/0016489 | A1 * | 1/2013 | Yeh et al. ........................ 361/807 |
| 2013/0152342 | A1 * | 6/2013 | Ahn et al. ........................ 16/354 |
| 2013/0318746 | A1 * | 12/2013 | Kuramochi ..................... 16/342 |
| 2014/0223693 | A1 * | 8/2014 | Hsu ................................ 16/282 |

* cited by examiner

*Primary Examiner* — Chuck Mah
(74) *Attorney, Agent, or Firm* — Guice Patents PLLC (57) ABSTRACT

A synchronous rotation mechanism for a dual-shaft hinge includes a first shaft, a second shaft, a first positioning plate, a second positioning plate, a first lead screw, a second lead screw and a guiding member. The first shaft and the second shaft extend through the first positioning plate and the second positioning plate. The first lead screw and the second lead screw are disposed on the first shaft and the second shaft respectively. A supporting shaft is disposed between the first lead screw and the second lead screw. The guiding member is supported by the supporting shaft and engages screw grooves formed on the first and second lead screws, whereby the first and the second shafts rotate synchronously.

8 Claims, 12 Drawing Sheets

SYNCHRONOUS ROTATION MECHANISM FOR DUAL-SHAFT HINGE

BACKGROUND OF THE INVENTION

1. Field of the Invention

The invention relates to a synchronous rotation mechanism for hinge having dual shafts, and more particularly to a simple structure allowing the two shafts to rotate synchronously.

2. Description of the Related Art

A typical laptop includes a mainframe and a display pivoted to the mainframe by a hinge. The display can be lifted by rotating with respect to the hinge when the laptop is to be used, and the display is closed when the laptop is not used.

To facilitate rotation of the display to a predetermined angle or flip of the display to be used as a tablet, a dual-shaft hinge is used for the rotation and the flip.

A conventional dual-shaft hinge includes a first shaft rotated along with the display and a second shaft rotated along with the mainframe. However, when the dual-display is rotated to a large angle or flip to overlap the mainframe by the dual shaft hinge, the display is rotated by one shaft to a specific angle first, and rotated to the intended angle by the other shaft. The entire rotation mechanism is so complicated that it causes high cost in manufacture and assembly, and also causes slow and not smooth in flip operation. It is inconvenient for the display flipped 360° by rotated to a predetermined angle by one shaft and then rotated by the other shaft.

BRIEF SUMMARY OF THE INVENTION

The invention provides a synchronous mechanism for a dual-shaft hinge. The synchronous mechanism in accordance with an exemplary embodiment of the invention includes a first shaft having an first end connected to a first mounting plate joined to a cover of an electronic device; a second shaft corresponding to the first shaft and having a second end connected to a second mounting plate joined to a mainframe of the electronic device; a first positioning plate, through which the first shaft and the second shaft extend rotatably, having a first hole formed between the first shaft and the second shaft; a second positioning plate, through which the first shaft and the second shaft extend rotatably, having a second hole formed between the first shaft and the second shaft and spaced from the first positioning plate by a distance; a first lead screw having a first screw groove and a first through hole fitted to the first shaft, and disposed between the first positioning plate and the second positioning plate; a second lead screw having a second screw groove and a second through hole fitted to the second shaft, and disposed between the first positioning plate and the second positioning plate; a supporting shaft extending through the first hole and the second hole; and a guiding wheel disposed on the supporting shaft and engaging the first screw groove and the second screw groove, wherein the first through hole has a cross section corresponding to a cross section of the first shaft, and the second through has a cross section corresponding to a cross section of the second shaft.

In another exemplary embodiment, the guiding wheel has an upper surface and a lower surface contacting and engaging the first screw groove and the second screw groove, the upper surface and the lower surface are conical curved.

The synchronous mechanism in accordance with another exemplary embodiment of the invention includes a first shaft having an first end connected to a first mounting plate joined to a cover of an electronic device; a second shaft corresponding to the first shaft and having a second end connected to a second mounting plate joined to a mainframe of the electronic device; a first positioning plate through which the first shaft and the second shaft extend rotatably; a second positioning plate, through which the first shaft and the second shaft extend rotatably, spaced from the first positioning plate by a distance; a first lead screw having a first screw groove and a first through hole fitted to the first shaft, and disposed between the first positioning plate and the second positioning plate; a second lead screw having a second screw groove and a second through hole fitted to the second shaft, and disposed between the first positioning plate and the second positioning plate; a guiding member having an upper guiding block and a lower guiding block engaging the first screw groove and the second screw groove; and a plurality of supporting members disposed between the first positioning plate, wherein the guiding member is movably disposed on the supporting members.

In another exemplary embodiment, the supporting member includes a first supporting shaft and a second supporting shaft, and the guiding member has two through holes through which the first supporting shaft and the second supporting shaft extend.

In yet another exemplary embodiment, the supporting member includes a first supporting shaft and a second supporting shaft, and the guiding member has two groove through which the first supporting shaft and the second supporting shaft extend.

In another exemplary embodiment, the synchronous rotation mechanism includes two limiting plates disposed on the first positioning plate and the second positioning plate, wherein the limiting plates are spaced by a width corresponding to a width of the guiding member.

In yet another exemplary embodiment, each of the limiting plates has a rib fitted to the first positioning plate and the second positioning plate.

In another exemplary embodiment, the first positioning plate and the second positioning plate have notches receiving the ribs so that the limiting plates are mounted on the first positioning plate and the second positioning plate.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
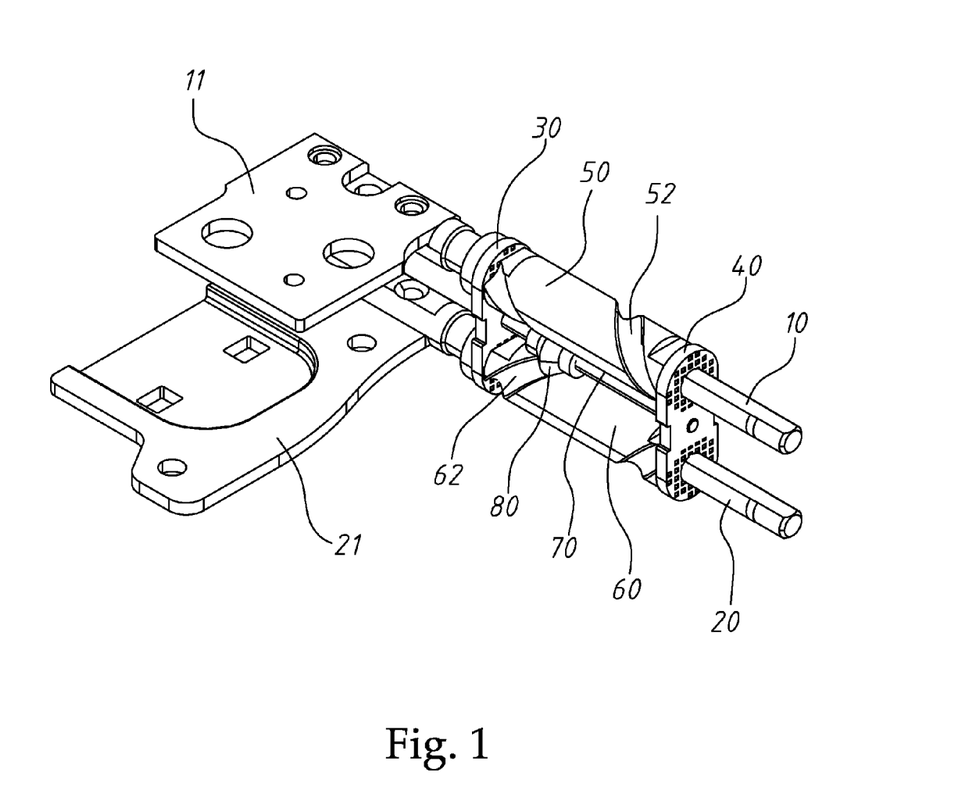
FIG. 1 is a perspective view of an embodiment of a synchronous mechanism of the invention.
Figure 2:
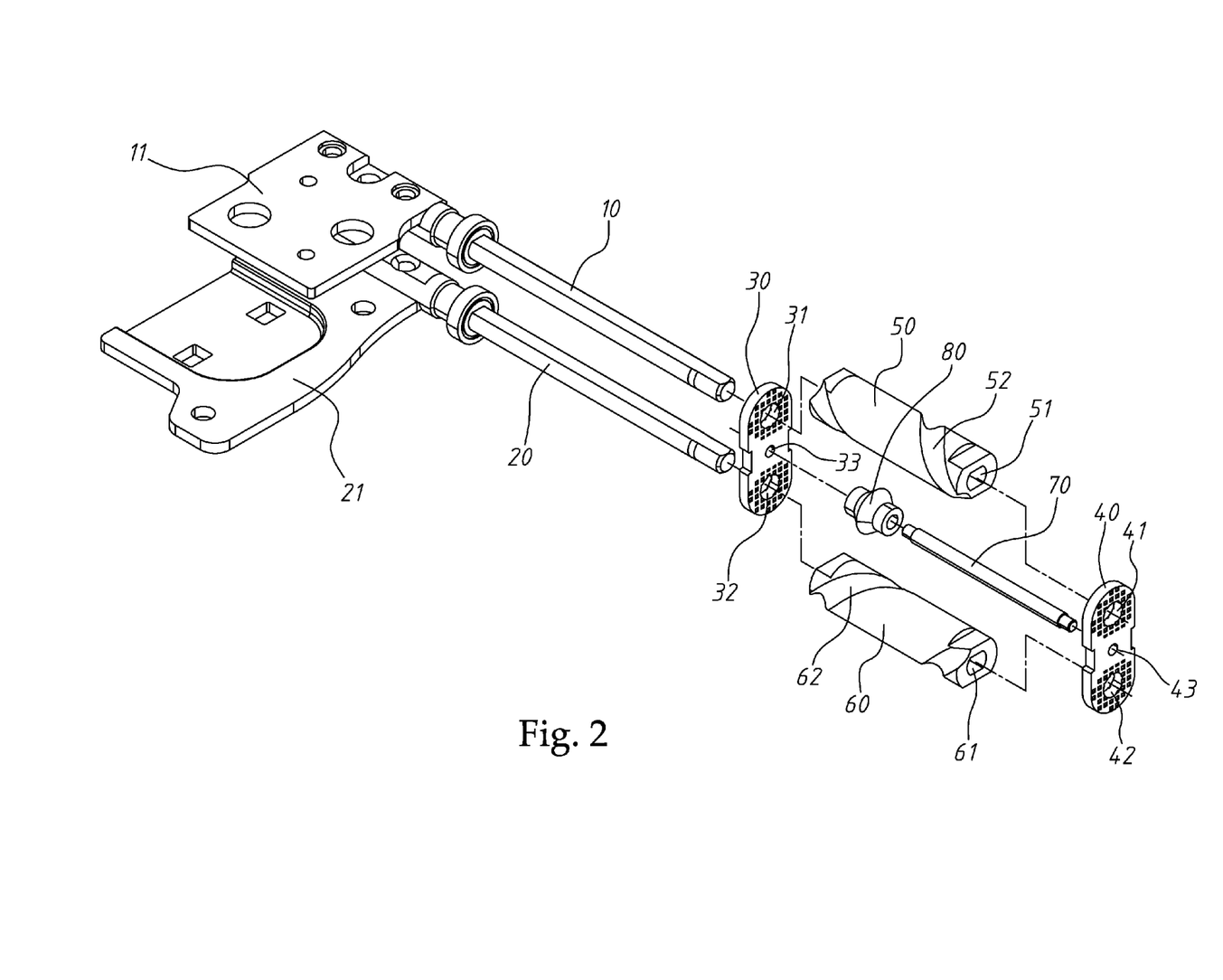
FIG. 2 is a perspective exploded view of the synchronous rotation mechanism of FIG. 1.

Referring to FIGS. 1 and 2, a synchronous rotation mechanism includes a first shaft 10 and a second shaft 20. The first shaft 10 has a first end joined to a first mounting plate 11 mounted to a display of a laptop. The second shaft 20 has a second end joined to a second mounting plate 21 mounted to a mainframe of a laptop. The first shaft 10 has the other end, which is opposite to the first end, joined to a concave washer, a convex washer, an elastic mechanism or a securing mechanism. Similarly, the second shaft 20 has the other end, which is opposite to the second end, joined to a concave washer, a convex washer, an elastic mechanism or a securing mechanism.

The first shaft 10 and the second shaft 20 are parallel and extend through a first positioning plate 30 and a second positioning plate 40 spaced from the first positioning plate 30 by a distance. The first positioning plate 30 has a first positioning holes 31 and a second positioning hole 32, and the second positioning plate 40 has a first positioning hole 41 and a second positioning holes 42. The first shaft 10 extends through the first positioning hole 31 and the second positioning hole 41, and the second shaft 20 extends through the first positioning hole 31 and the second positioning hole 42. Each of the first shaft 10 and the second shaft 20 has flat planes on two opposite sides of its outer periphery, which is a double D shaft. The first positioning holes 31, 41 and the second positioning holes 32, 42 have however a circular cross section. In such a structure, the first shaft 10 and the second shaft 20 are able to rotate when the first shaft 10 and the second shaft 20 are fitted to the first positioning holes 31, 41 and the second positioning holes 32, 42 respectively. A first hole 33 is formed on the first positioning plate 30 and located between the first positioning hole 31 and the second positioning hole 32. A second hole 43 is formed on the second positioning plate 40 and located between the first positioning hole 41 and the second positioning hole 42. A supporting shaft 70 extends through the first hole 33 and the second hole 43.

Figure 3:
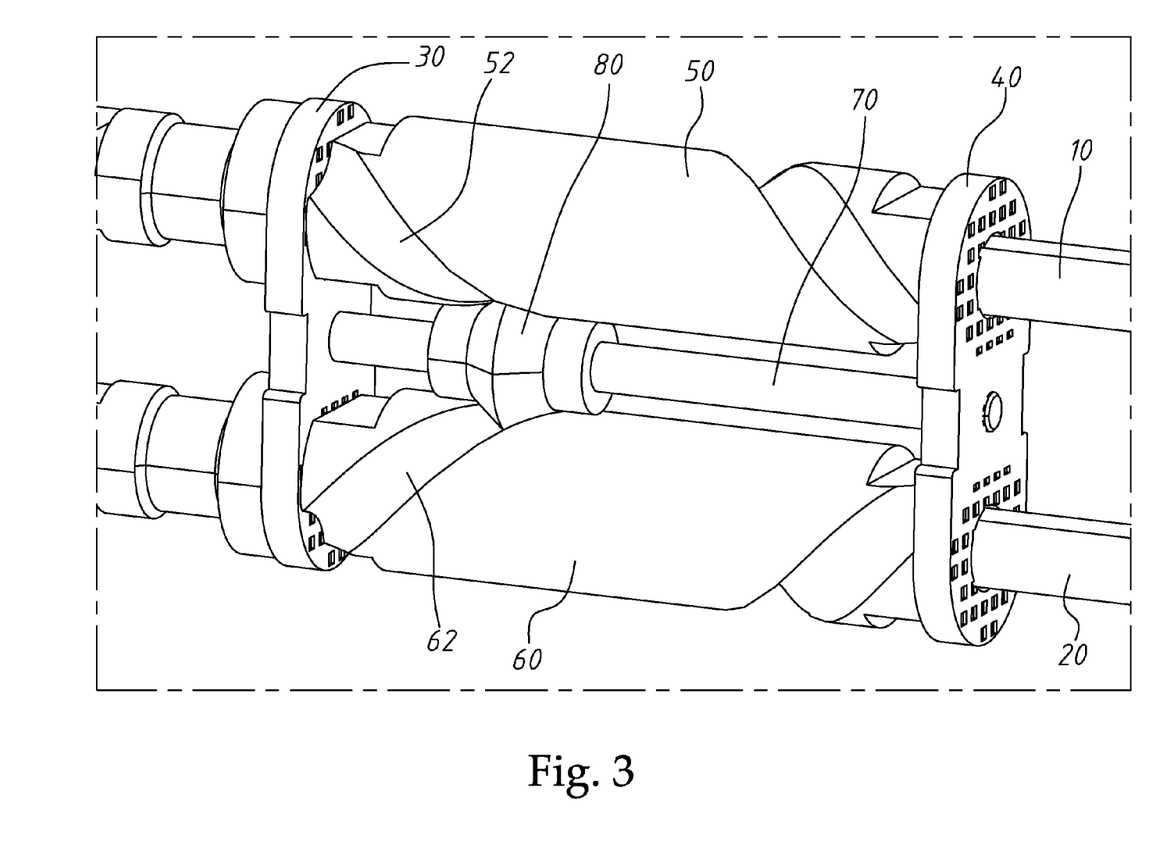
FIG. 3 is a partially enlarged view of the synchronous rotation mechanism of FIG. 1.

A first lead screw 50 has a first through hole 51 fitted to the first shaft 10, and a second lead screw 60 has a second through hole 61 fitted to the second shaft 20. The first through hole 51 and the second through hole 61 have a cross section similar to the first shaft 10 and the second shaft 20, and are the double D holes. Thus, the first lead screw 50 and the second lead screw 60 are rotated along with the first shaft 10 and the second shaft 20. The first lead screw 50 has a first screw groove 52, and the second lead screw 60 has a second screw groove 62. A guiding wheel 80 is disposed on the supporting shaft 70 and engages the first screw groove 52 and the second screw groove 62. The guiding wheel 80 includes an upper surface and a lower surface. The upper surface and the lower surface are conical curved and contact the first screw groove 52 and the second screw groove 62 respectively.

Figure 4:
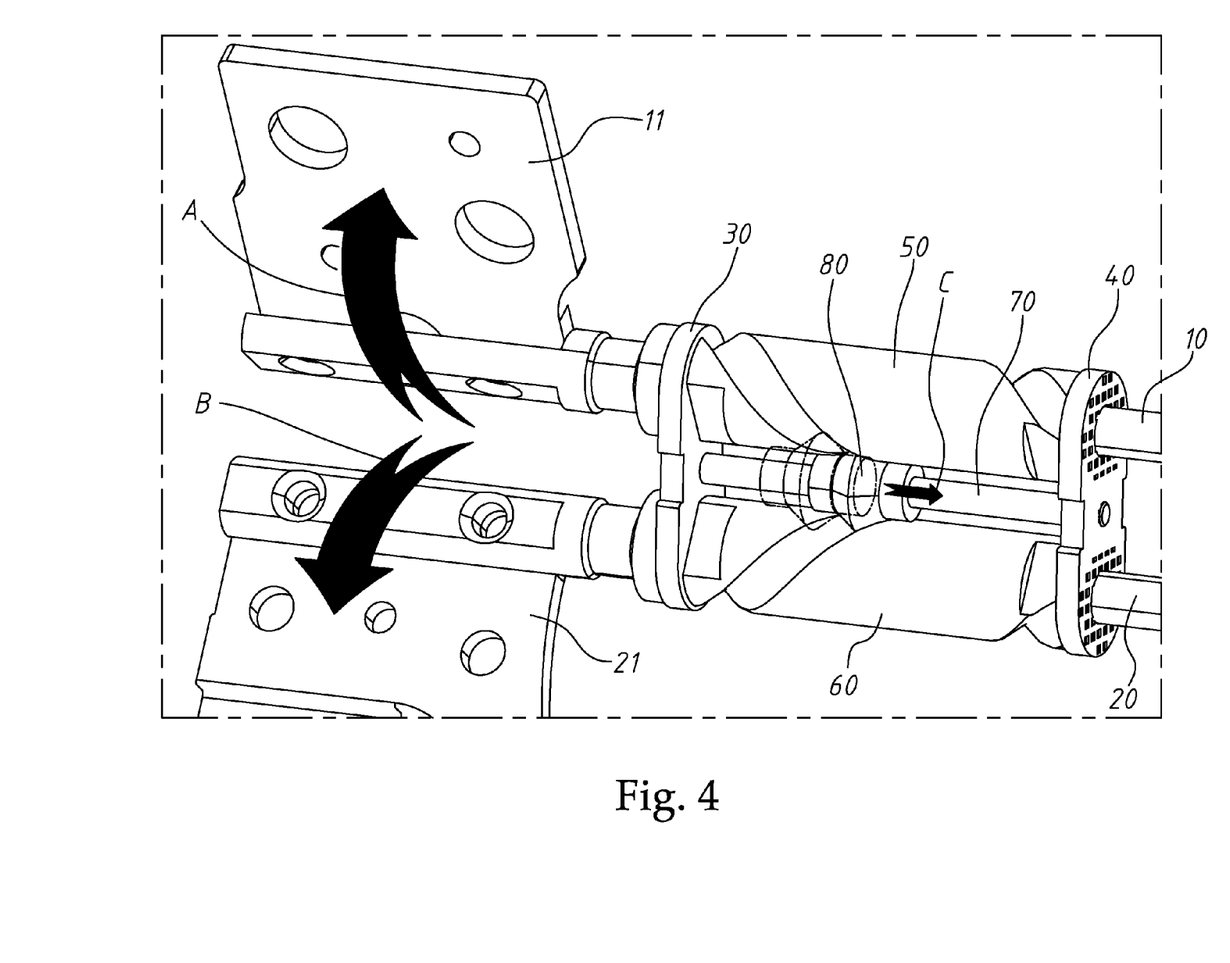
FIG. 4 depicts movements of the synchronous rotation mechanism of FIG. 3.

Referring to FIG. 4, when the first shaft 10 is rotated in a direction shown by the arrow A (lifting the display of the laptop) or the second shaft 20 is rotated in a direction shown by the arrows B (rotating the mainframe of the laptop), the rotation of the first shaft 10 or the second shaft 20 moves the guiding wheel 80 along the supporting shaft 70 forwards or backwards in a direction shown by the arrow C. The movement of the guiding wheel 80 causes the rotation of the first shaft 10 synchronized with the second shaft 20 but in opposite directions.

Figure 5:
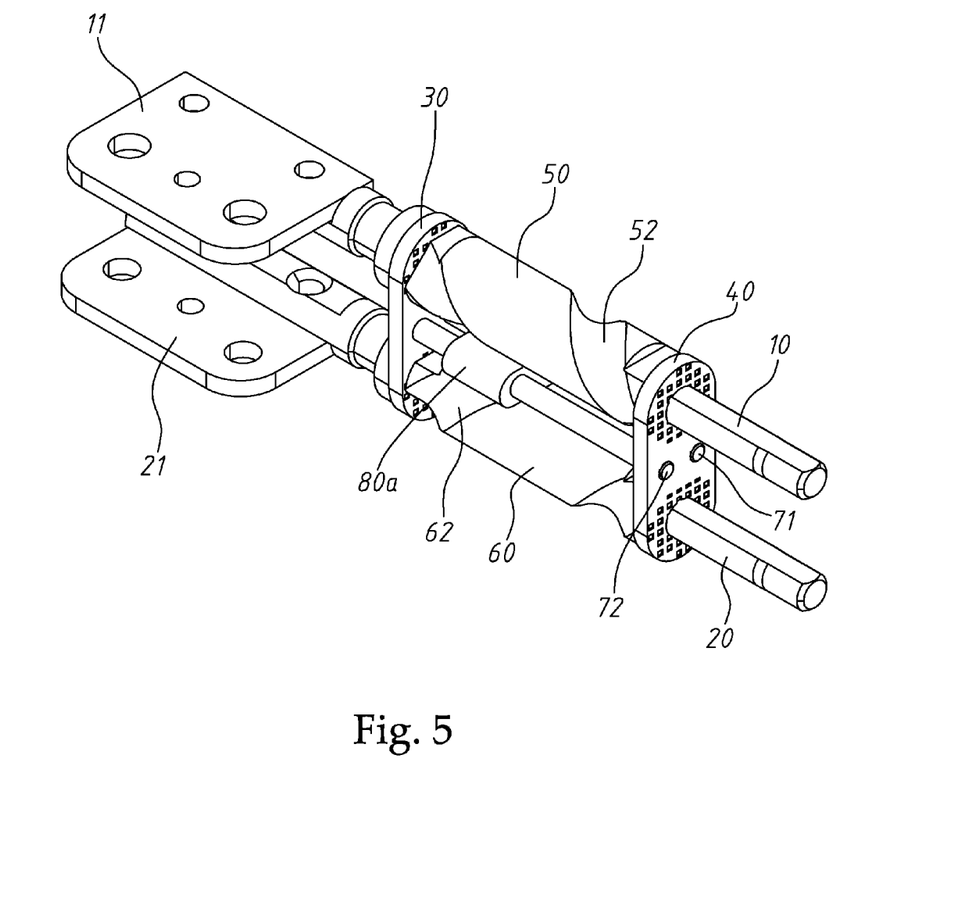
FIG. 5 is a perspective view of another embodiment of a synchronous rotation mechanism of the invention.
Figure 6:
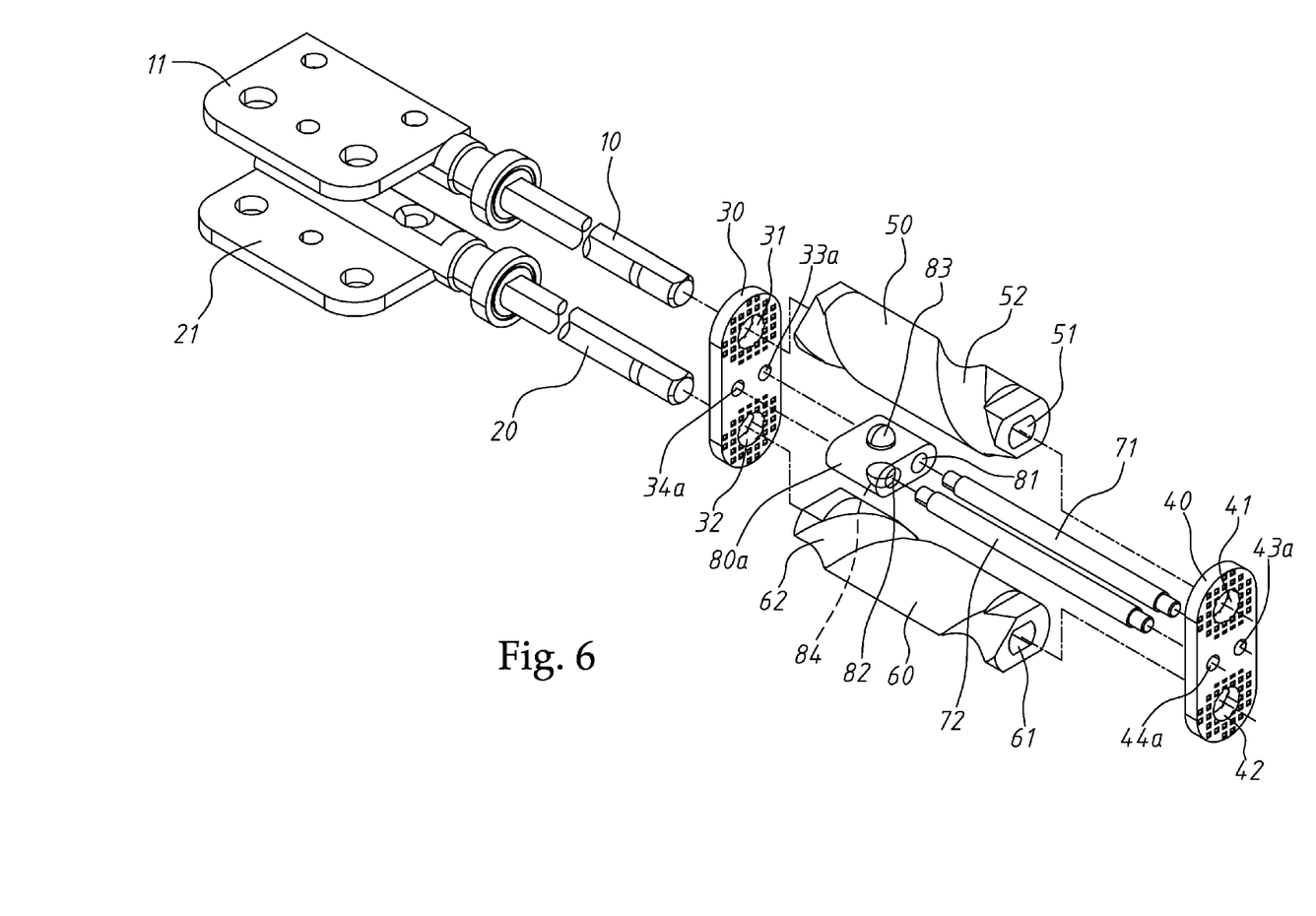
FIG. 6 is a perspective exploded view of the synchronous rotation mechanism of FIG. 5.

Referring to FIGS. 5 and 6, another embodiment of the synchronous rotation mechanism of the invention is disclosed. The synchronous rotation mechanism includes a first shaft 10 and a second shaft 20. The first shaft 10 has a first end joined to a first mounting plate 11 mounted to a display of a laptop. The second shaft 20 has a second end joined to a second mounting plate 21 mounted to a mainframe of a laptop. The first shaft 10 has the other end, which is opposite to the first end, joined to a cam, an elastic mechanism or a securing mechanism. Similarly, the second shaft 20 has the other end, which is opposite to the second end, joined to a cam, an elastic mechanism or a securing mechanism.

The first shaft 10 and the second shaft 20 are parallel and extend through a first positioning plate 30 and a second positioning plate 40 spaced from the first positioning plate 30 by a distance. The first positioning plate 30 has a first positioning holes 31 and a second positioning hole 32, and the second positioning plate 40 has a first positioning hole 41 and a second positioning holes 42. The first shaft 10 extends through the first positioning hole 31 and the second positioning hole 41, and the second shaft 20 extends through the first positioning hole 41 and the second positioning hole 42. In this embodiment, two holes 33a and 34a are formed between the first positioning hole 31 and the second positioning hole 32, and two holes 43a and 44a are formed between the first positioning hole 41 and the second positioning hole 42. A first supporting shaft 71 extends through the holes 33a and 43a, and a second supporting shaft 72 extends through the holes 34a and 44a.

A first lead screw 50 has a first through hole 51 fitted to the first shaft 10, and a second lead screw 60 has a second through hole 61 fitted to the second shaft 20. The first through hole 51 and the second through hole 61 have a cross section similar to the first shaft 10 and the second shaft 20, and are the double D holes. Thus, the first lead screw 50 and the second lead screw 60 are rotated along with the first shaft 10 and the second shaft 20. The first lead screw 50 has a first screw groove 52, and the second lead screw 60 has a second screw groove 62. In this embodiment, a guiding member 80a has through holes 81 and 82 fitted to the first supporting shaft 71 and the second supporting shaft 72 respectively and has a guiding block 83 engaging the first screw groove 52 and a guiding block 84 engaging the second screw groove 62.

Figure 7:
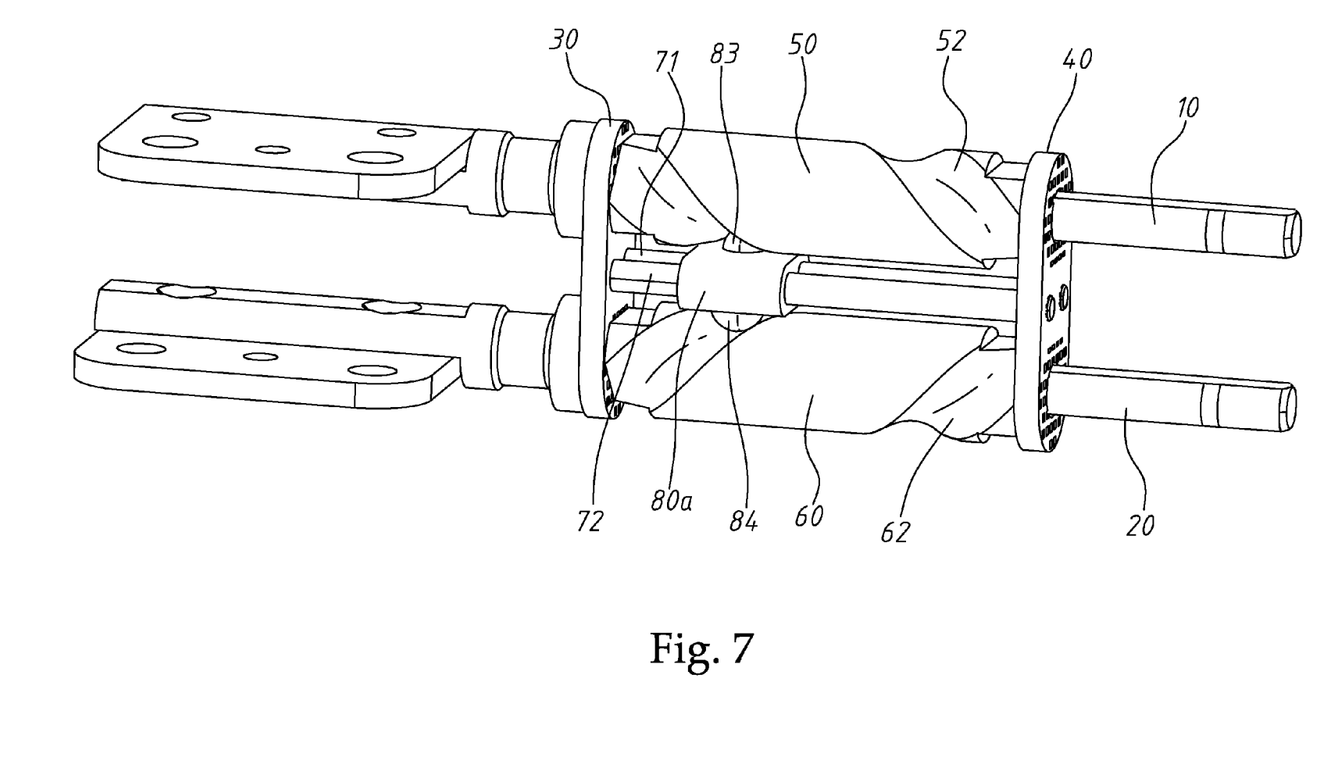
FIG. 7 is another perspective view of the synchronous rotation mechanism of FIG. 5.
Figure 8:
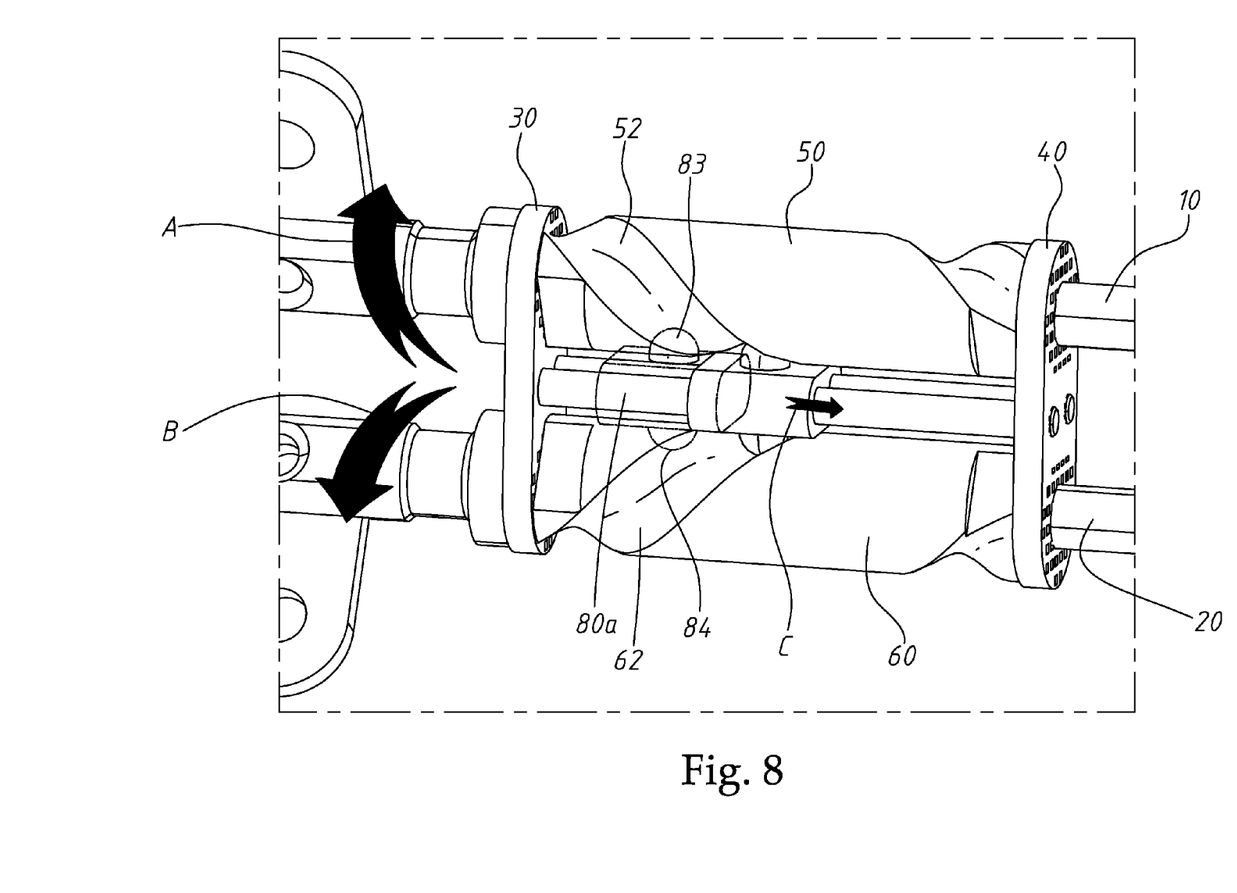
FIG. 8 is a partially enlarged view of the synchronous rotation mechanism of FIG. 7.

Referring to FIGS. 7 and 8, when the first shaft 10 is rotated in a direction shown by the arrow A (lifting the display of the laptop) or the second shaft 20 is rotated in a direction shown by the arrows B (rotating the mainframe of the laptop), the rotation of the first shaft 10 or the second shaft 20 moves the guiding wheel 80a along the supporting shafts 71 and 72 forwards or backwards in a direction shown by the arrow C. The movement of the guiding wheel 80a causes the rotation of the first shaft 10 synchronized with the second shaft 20 but in opposite directions. Although two supporting shafts (the first supporting shaft 71 and the second supporting shaft 72) are used in this embodiment, it is not limited thereto. More than two supporting shafts are also applicable.

In this embodiment, as the guiding member 80a is supported by two supporting shafts during its reciprocated travel, the rotation of the display with the dual-shaft hinge become smoother.

Figure 9:
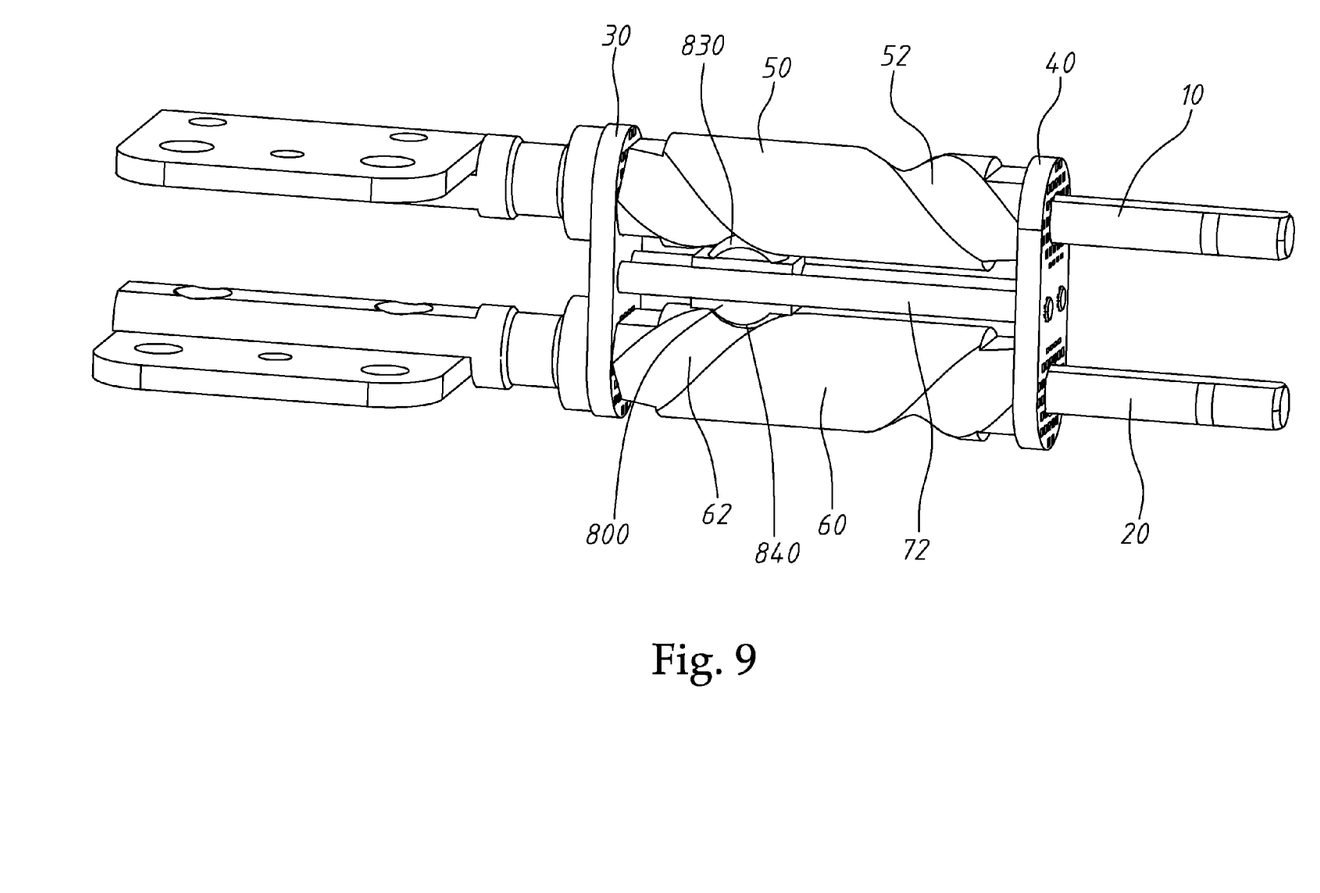
FIG. 9 is a perspective view of another embodiment of a synchronous rotation mechanism of the invention.
Figure 10:
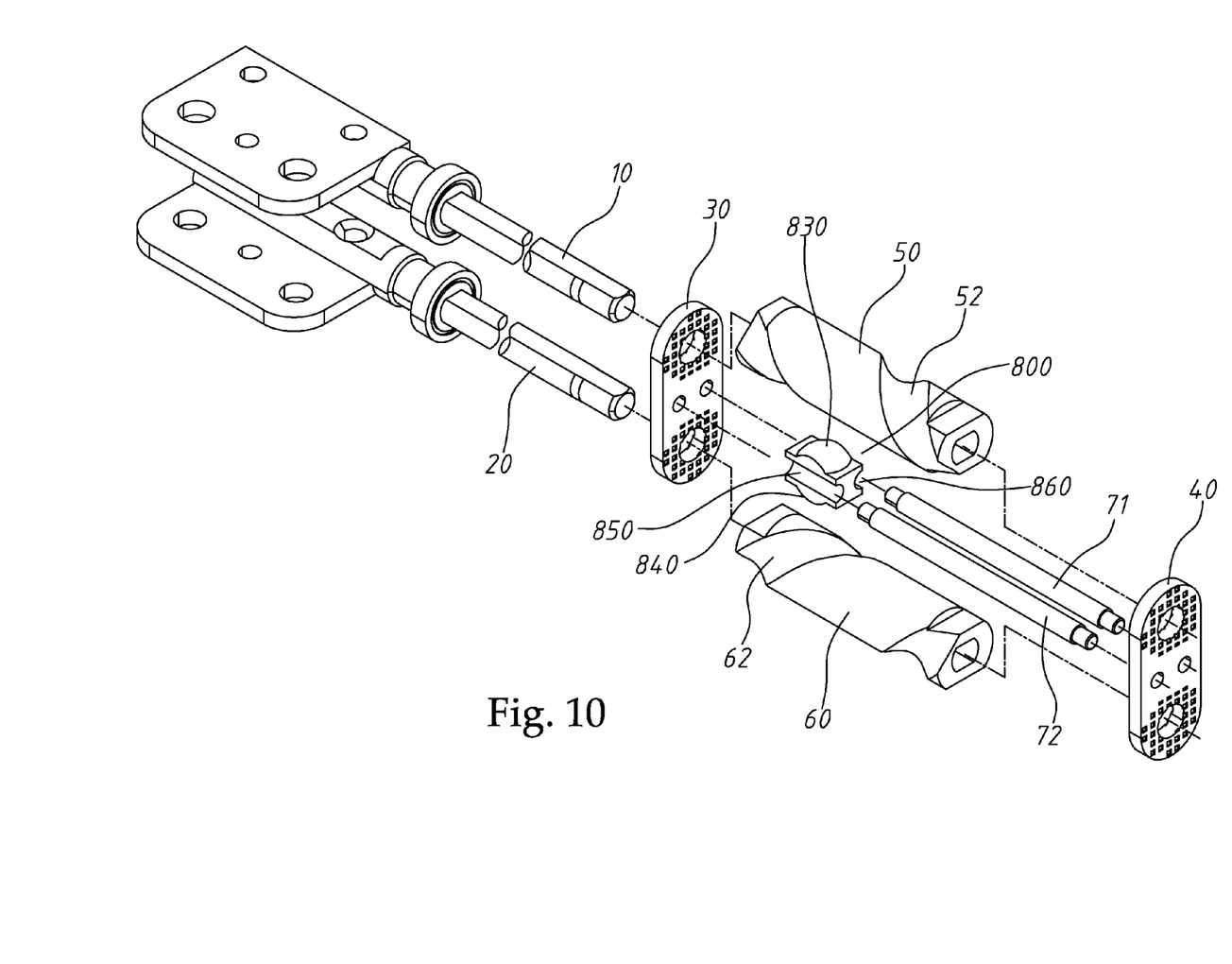
FIG. 10 is a perspective exploded view of the synchronous rotation mechanism of FIG. 9.

Referring to FIGS. 9 and 10, another embodiment of the synchronous rotation mechanism of the invention is disclosed. Similar to the previous embodiments, the synchronous rotation mechanism of this embodiment includes a first shaft 10, a second shaft 20, a first positioning plate 30, a second positioning plate 40, a first lead screw 50 having a first screw groove 52, a second lead screw 60 having a second screw groove 62 and a guiding member 800. In this embodiment, the guiding member 800 has a guiding block 830 disposed on an upper surface of the guiding member 800 and a guiding block 840 disposed on a lower surface of the guiding member 800. The guiding block 830 engages the screw groove 52 of the lead screw 50, and the guiding block 840 engages the screw groove 62 of the lead screw 60. The guiding member 800 further includes grooves 850 and 860 formed on two opposite lateral sides through which the first supporting shaft 71 and the second shaft 72 extend.

Figure 11:
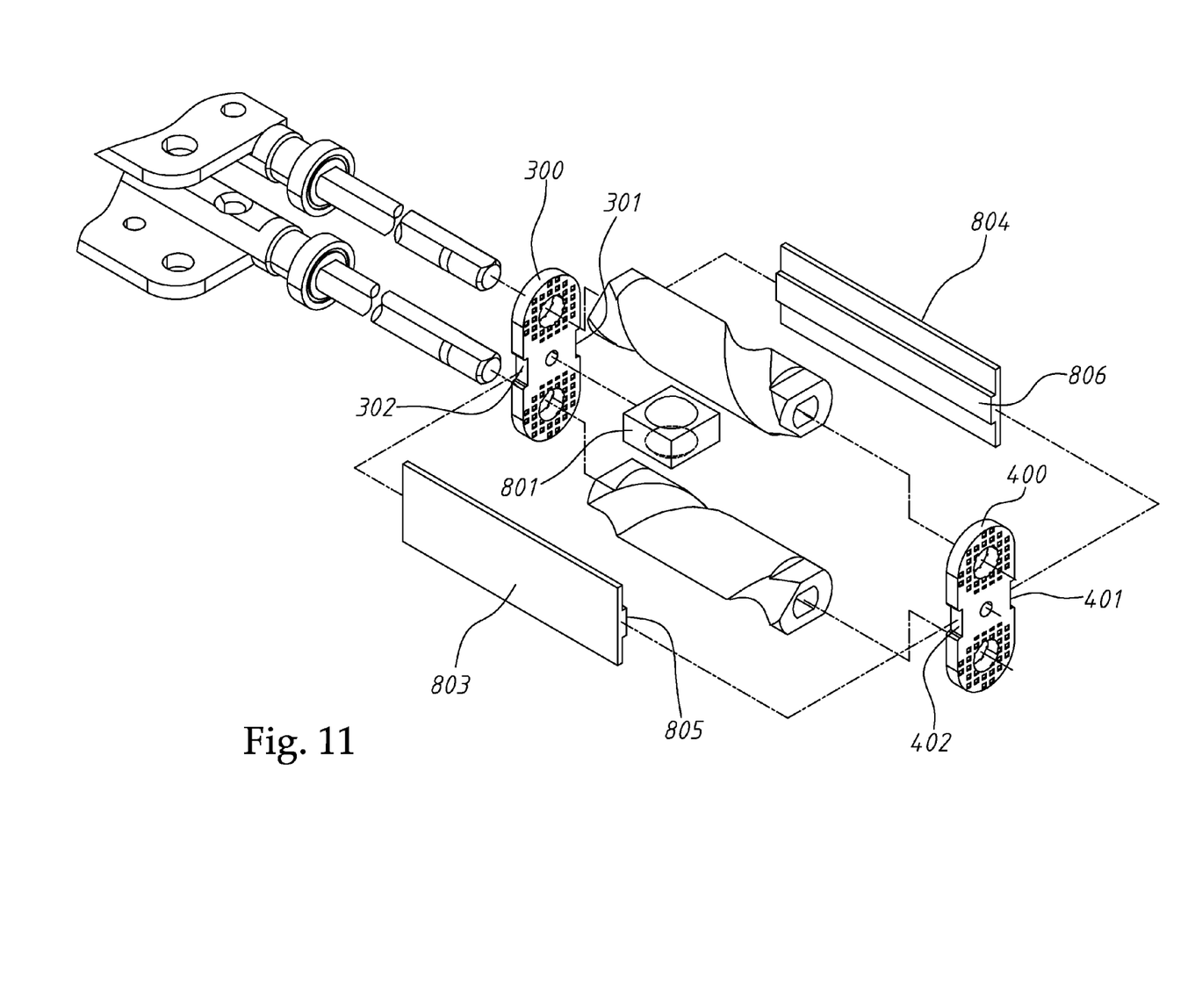
FIG. 11 is a perspective view of another embodiment of a synchronous rotation mechanism of the invention.
Figure 12:
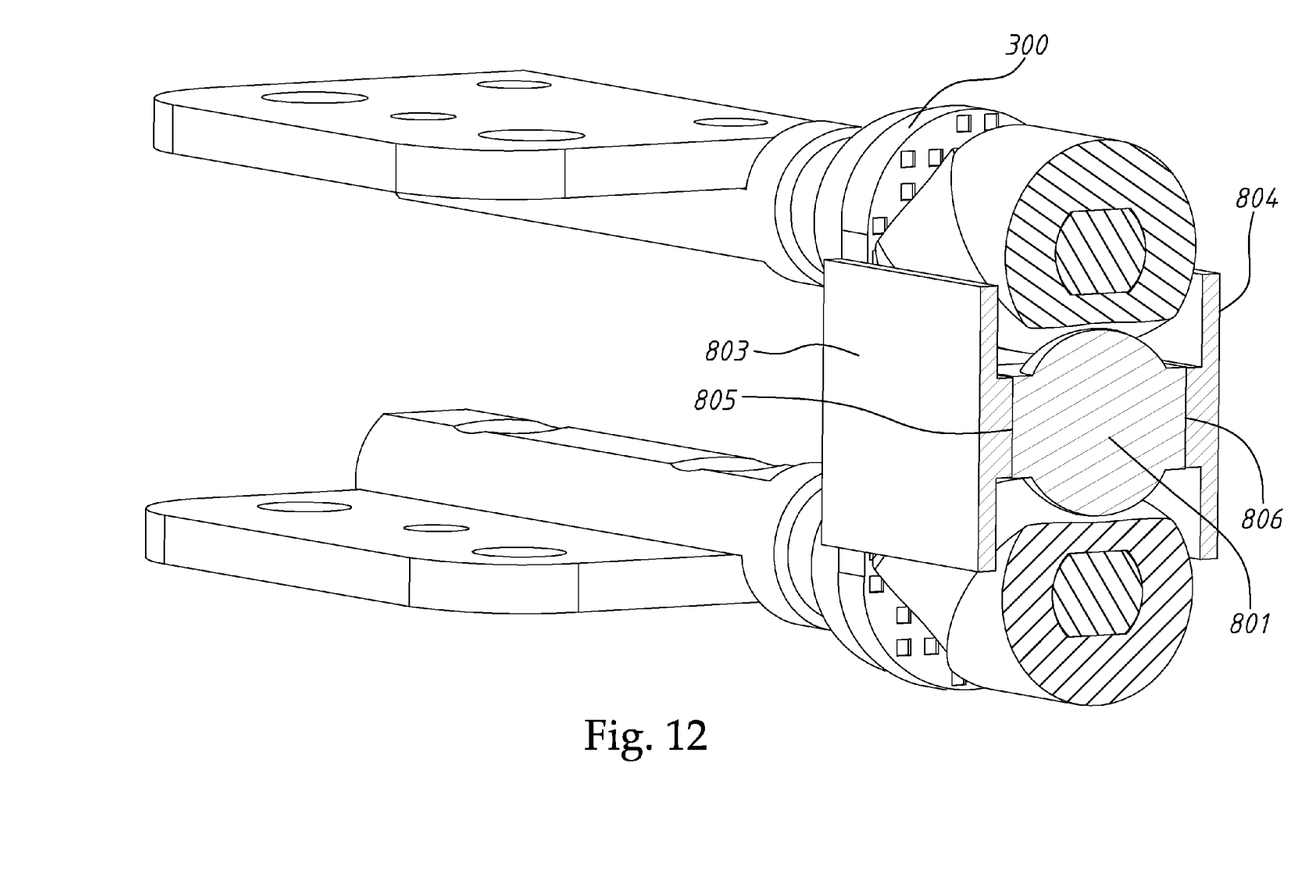
FIG. 12 is a partially enlarged view of the synchronous rotation mechanism of FIG. 11.

Referring to FIGS. 11 and 12, another embodiment of the synchronous rotation mechanism of the invention is disclosed. In this embodiment, a guiding member 801 is a block having a specific width. Two limiting plates 803 and 804 disposed on the first and second positioning plates 300 and 400 serve as supporting members. The width of a space formed by the limiting plates 803 and 804 corresponding to width of the guiding block 801, whereby the guiding block 801 moves forwards and backwards in the space smoothly. In this embodiment, the limiting plates 803 has a rib 805, and the limiting plate 804 has rib 806. The ribs 805 engages notches 301 and 302 formed on the first positioning plate 300 and the second positioning plate 400 respectively. The ribs 806 engages notches 401 and 402 formed on the first positioning plate 300 and the second positioning plate 400 respectively.

The synchronous rotation mechanism of the invention uses two lead screws and a guiding wheel to synchronize two shafts of the dual-shaft hinge. When the display of the laptop is lifted or closed, two shafts and the guiding wheel of the synchronous rotation mechanism rotate synchronously, which make the rotation of the display smooth.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronous rotation mechanism for a dual-shaft hinge, comprising:
    a first shaft having an first end connected to a first mounting plate;
    a second shaft corresponding to the first shaft and having a second end connected to a second mounting plate;
    a first positioning plate, through which the first shaft and the second shaft extend rotatably, having a first hole formed between the first shaft and the second shaft;
    a second positioning plate, through which the first shaft and the second shaft extend rotatably, having a second hole formed between the first shaft and the second shaft and spaced from the first positioning plate by a distance;
    a first lead screw having a first screw groove and a first through hole fitted to the first shaft, and disposed between the first positioning plate and the second positioning plate;
    a second lead screw having a second screw groove and a second through hole fitted to the second shaft, and disposed between the first positioning plate and the second positioning plate;
    a supporting shaft extending through the first hole and the second hole; and
    a guiding wheel movably disposed on the supporting shaft and engaging the first screw groove and the second screw groove, wherein the first through hole has a cross section corresponding to a cross section of the first shaft, and the second through has a cross section corresponding to a cross section of the second shaft.

2. The synchronous rotation mechanism as claimed in claim 1, wherein the guiding wheel has an upper surface and a lower surface contacting and engaging the first screw groove and the second screw groove, the upper surface and the lower surface are conical curved.

3. A synchronous rotation mechanism for a dual-shaft hinge in an electronic device, comprising:
    a first shaft having an first end connected to a first mounting plate joined to a cover of an electronic device;
    a second shaft corresponding to the first shaft and having a second end connected to a second mounting plate joined to a mainframe of the electronic device;
    a first positioning plate, through which the first shaft and the second shaft extend rotatably;
    a second positioning plate, through which the first shaft and the second shaft extend rotatably, spaced from the first positioning plate by a distance;
    a first lead screw having a first screw groove and a first through hole fitted to the first shaft, and disposed between the first positioning plate and the second positioning plate;
    a second lead screw having a second screw groove and a second through hole fitted to the second shaft, and disposed between the first positioning plate and the second positioning plate;
    a guiding member having an upper guiding block and a lower guiding block respectively engaging the first screw groove and the second screw groove; and
    a plurality of supporting members disposed between the first positioning plate and the second positioning plate, wherein the guiding member is movably disposed on the supporting members.

4. The synchronous rotation mechanism as claimed in claim 3, wherein each of the supporting members comprises a first supporting shaft and a second supporting shaft, and the guiding member has two through holes through which the first supporting shaft and the second supporting shaft respectively extend.

5. The synchronous rotation mechanism as claimed in claim 3, wherein each of the supporting members comprises a first supporting shaft and a second supporting shaft, and the guiding member has two grooves through which the first supporting shaft and the second supporting shaft respectively extend.

6. The synchronous rotation mechanism as claimed in claim 3, wherein said plurality of supporting members comprise two limiting plates disposed on the first positioning plate and the second positioning plate, wherein the limiting plates are spaced by a width corresponding to a width of the guiding member.

7. The synchronous rotation mechanism as claimed in claim 6, wherein each of the limiting plates has a rib fitted to the first positioning plate and the second positioning plate.

8. The synchronous rotation mechanism as claimed in claim 7, wherein the first positioning plate and the second positioning plate have notches receiving the ribs so that the limiting plates are mounted on the first positioning plate and the second positioning plate.

* * * * *